(12) United States Patent
Pezeshki

(10) Patent No.: US 6,791,694 B2
(45) Date of Patent: Sep. 14, 2004

(54) TUNABLE OPTICAL DEVICE USING A SCANNING MEMS MIRROR

(75) Inventor: Bardia Pezeshki, Redwood City, CA (US)

(73) Assignee: Santur Corporation, Fremont, CA (US)

(*) Notice: Subject to any disclaimer, the term of this patent is extended or adjusted under 35 U.S.C. 154(b) by 0 days.

(21) Appl. No.: 10/051,391

(22) Filed: Jan. 16, 2002

(65) Prior Publication Data

US 2002/0105653 A1 Aug. 8, 2002

Related U.S. Application Data

(60) Provisional application No. 60/262,445, filed on Jan. 16, 2001, and provisional application No. 60/263,591, filed on Jan. 22, 2001.

(51) Int. Cl.[7] ................................................. G01B 9/02
(52) U.S. Cl. ........................................ 356/519; 356/454
(58) Field of Search ................................ 356/326, 328, 356/330, 332, 334, 451, 454, 455, 519

(56) References Cited

U.S. PATENT DOCUMENTS

| | | | |
|---|---|---|---|
| 4,317,611 A | | 3/1982 | Petersen |
| 4,498,730 A | | 2/1985 | Tanaka et al. |
| 4,768,182 A | * | 8/1988 | Hatfield ................. 369/112.29 |
| 5,136,598 A | | 8/1992 | Weller et al. |
| 5,274,489 A | | 12/1993 | Smith et al. |
| 5,283,796 A | | 2/1994 | Fink |
| 5,291,502 A | | 3/1994 | Pezeshki et al. |
| 5,378,330 A | | 1/1995 | Li et al. |
| 5,379,310 A | | 1/1995 | Papen et al. |
| 5,420,416 A | | 5/1995 | Iida et al. |
| 5,428,635 A | | 6/1995 | Zhiglinsky et al. |
| 5,468,975 A | | 11/1995 | Valster |
| 5,515,196 A | | 5/1996 | Kitajima et al. |
| 5,612,968 A | | 3/1997 | Zah |
| 5,629,790 A | | 5/1997 | Neukermans et al. |
| 5,689,361 A | | 11/1997 | Damen et al. |
| 5,715,047 A | * | 2/1998 | Adamovsky ................ 356/128 |
| 5,771,253 A | | 6/1998 | Chang-Hasnain et al. |
| 5,777,763 A | | 7/1998 | Tomlinson, III |
| 5,784,507 A | * | 7/1998 | Holm-Kennedy et al. .... 385/31 |
| 5,793,912 A | | 8/1998 | Boord et al. |
| 5,798,859 A | | 8/1998 | Colbourne et al. |
| 5,825,792 A | | 10/1998 | Villeneuve et al. |
| 5,828,689 A | | 10/1998 | Epworth |
| 5,882,468 A | | 3/1999 | Crockett et al. |
| 5,930,045 A | | 7/1999 | Shirasaki |
| 5,946,140 A | | 8/1999 | Huang |
| 5,949,544 A | | 9/1999 | Manning |
| 5,977,567 A | | 11/1999 | Verdiell |

(List continued on next page.)

FOREIGN PATENT DOCUMENTS

| | | |
|---|---|---|
| FR | 2805092 | 8/2001 |
| WO | WO 02/13343 A2 | 2/2002 |
| WO | WO 02/37069 A1 | 5/2002 |
| WO | WO 02/37621 A2 | 5/2002 |
| WO | WO 02/058197 A2 | 7/2002 |
| WO | WO 02/013343 A3 | 7/2003 |

OTHER PUBLICATIONS

"Broadband Lightwave Sources and System", Gayton Photonics Ltd., http://www.infowin.org/ACTS/RUS/PROJECTS/ac065.htm, printed Oct. 17, 2000 (4 pages).

(List continued on next page.)

*Primary Examiner*—Samuel A. Turner
*Assistant Examiner*—Michael A. Lyons
(74) *Attorney, Agent, or Firm*—Christie, Parker & Hale, LLP

(57) ABSTRACT

An optical configuration that provides tunable characteristics. The tunable characteristics are applicable, for example, for channel monitoring, dispersion compensation and polarization-dependent loss. A passive optical element is used where the optical properties of this element varies as a function of position on the element.

42 Claims, 7 Drawing Sheets

U.S. PATENT DOCUMENTS

| | | | |
|---|---|---|---|
| 5,999,545 | A | 12/1999 | Jeon et al. |
| 6,049,554 | A | 4/2000 | Lang et al. |
| 6,078,394 | A | 6/2000 | Wood |
| 6,091,537 | A | 7/2000 | Sun et al. |
| 6,097,860 | A | 8/2000 | Laor |
| 6,154,588 | A | 11/2000 | Kai |
| 6,167,075 | A | 12/2000 | Craig et al. |
| 6,168,319 | B1 | 1/2001 | Francis |
| 6,175,668 | B1 | 1/2001 | Borrelli et al. |
| 6,191,897 | B1 | 2/2001 | Blake et al. |
| 6,201,629 | B1 | 3/2001 | McClelland et al. |
| 6,212,151 | B1 | 4/2001 | Heanue et al. |
| 6,227,724 | B1 | 5/2001 | Verdiell |
| 6,256,328 | B1 | 7/2001 | Delfyett et al. |
| 6,263,002 | B1 | 7/2001 | Hsu et al. |
| 6,272,271 | B1 | 8/2001 | Wojnarowski et al. |
| 6,275,315 | B1 | 8/2001 | Park et al. |
| 6,295,308 | B1 | 9/2001 | Zah |
| 6,316,764 | B2 | 11/2001 | Heffner et al. |
| 6,327,063 | B1 | 12/2001 | Rockwell |
| 6,350,064 | B2 | 2/2002 | Mitsuda et al. |
| 6,352,376 | B2 | 3/2002 | Walters et al. |
| 6,433,390 | B1 | 8/2002 | Hara |
| 6,597,827 | B1 | 7/2003 | Brener et al. |
| 2001/0017876 | A1 | 8/2001 | Kner et al. |
| 2001/0021053 | A1 | 9/2001 | Colbourne et al. |
| 2001/0036206 | A1 | 11/2001 | Jerman et al. |
| 2001/0046077 | A1 | 11/2001 | Akiyama et al. |
| 2002/0018334 | A1 | 2/2002 | Hill et al. |
| 2002/0064192 | A1 | 5/2002 | Missey et al. |
| 2002/0141690 | A1 | 10/2002 | Jin et al. |
| 2002/0171901 | A1 | 11/2002 | Bernstein |

OTHER PUBLICATIONS

Dellunde, Jaume, "Laser diodes", http://www.geocities.com/jdellund/receng.htm, printed Aug. 8, 2001 (4 pages).

Hunter, D.K., et al., "Guided wave optical switch architectures. Part 1. Space switching", International Journal of Optoelectronics, vol. 9, No. 6, 1994 (pp. 477–487).

Solgaard, O., et al., "Optoelectronic Packaging Using Silicon Surface–Micromachined Alignment Mirrors", IEEE Photonics Technology Letters, vol. 7, No. 1, 1995 (pp. 41–43) (4 pages total).

Li, G.P., et al., "16–Wavelength Gain–Coupled DFB Laser Array with Fine Tunability", IEEE Photonics Technology Letters, vol. 8, No. 1, Jan. 1996 (pp. 22–24).

Gordon, C., "Hybrid Mode–Locked DBR–laser", Multidisciplinary Optical Switching Technology Center, http://www.ece.ucsb.edu/MOST/33.html, (last updated Jan. 22, 1996), printed Aug. 5, 2001 (3 pages).

Daneman, M. J., et al., "Laser–to–Fiber Coupling Module Using a Micromachined Alignment Mirror", IEEE Photonics Technology Letters, vol. 8, No. 3, Mar. 1996 (pp. 396–398).

Wu, M., "Micromachining for Optical and Optoelectronic Systems", Proceedings of the IEEE, vol. 85, No. 11, Nov. 1997 (pp. 1833, 1943–1952).

Jacques, S., "Phase conjugate mirror and diffraction grating yield stable, collimated, coherent, high–power diode laser.", Oregon Medical Laser Center Newsletter, http://omlc.ogi.edu/news/dec97/pclaser.html, printed Apr. 9, 2001, (2 pages).

Shirasaki, M., "Chromatic–Dispersion Compensator Using Virtually Imaged Phased Array", IEEE Photonics Technology Letters, vol. 9, No. 12, Dec. 1997 (pp. 1598–1600).

Kopka, P., et al., "Bistable 2×2 and Multistable 1×4 Micromechanical Fibre–optic Switches on Silicon", Micro Opto Electro Mechanical Systems, MOEMS 1999 (4 pages).

Maluf, N., "Optical switches", An Introduction to Microelectromechanical Systems Engineering, 2000, pp. 187–190 (3 pages).

Hunwicks, A., "Advancing the Optical Component", http://www.telecoms–mag.com/issues/200004/tci/advancing.html, Apr. 2000, printed Oct. 17, 2000 (6 pages).

Howe, P., "Light fantastic", digitalMASS at Boston.com, http://digitalmass.boston.com/news/daily/05/22/light_fantastic.html, printed Oct. 17, 2000 (5 pages).

Silverman, S., "Vcs beam big bucks at optics upstarts", Redherring.com, Oct. 9, 2000, http://www.redherring.com/vc/2000/1009/vc–optics100900.html?id=yahoo, printed Oct. 10, 2000 (5 pages).

International Search Report for International Application No. PCT/US02/01607 filed Jan. 16, 2002, mailed Jun. 24, 2002 (2 pgs.).

* cited by examiner

TUNABLE OPTICAL DEVICE USING A SCANNING MEMS MIRROR

CROSS-REFERENCE TO RELATED APPLICATIONS

This application claims the benefit of U.S. Provisional Pat. Application No. 60/262,445 entitled Tunable Optical Device Using a Scanning MEMS Mirror, filed Jan. 16, 2001, and U.S. Provisional Patent Application No. 60/263,591 entitled Tunable Optical Device Using a Scanning MEMS Mirror, filed Jan. 22, 2001, the disclosures of which are incorporated by reference.

BACKGROUND OF THE INVENTION

The present invention relates generally to optical devices, and more particularly to tunable optical devices useful for telecommunication applications.

Fiber optics communications is advancing beyond simple point-to-point links with static signal properties to one of complex networks of nodes, where signals travel different distances and through different types of fibers and amplifiers depending on the time-varying configuration of the network. In such reconfigurable networks, the properties of the signal are often varied depending on how far and through which fiber a signal has traveled to a particular node.

For example, as an optical signal passes through optical fiber, dispersion of the signal accumulates, degrading the quality of the signal. Dispersion of the signal may be a result of chromatic dispersion or possibly polarization dispersion. The extent of chromatic dispersion depends on the wavelength of the signal, the fiber type, and the transmission distance. Polarization dispersion may result due to fiber imperfections or uneven fiber stresses.

To properly receive the signal, the total dispersion generally should be balanced. This may be accomplished through use of a device which supplies an amount of dispersion opposite to that which has been accumulated during transmission. Such devices, however, may be relatively expensive. In addition, such devices may be inflexible in that they do not account for changes in a network over time, whether due to aging or transient environmental factors such as temperature.

Similarly, as a multi-wavelength optical signal passes through a chain of amplifiers, the gain seen by the different wavelengths varies depending on the number of amplifiers, the optical powers of other channels, and the wavelengths themselves. Generally, the power of the signal should be adjusted periodically such that the signal to noise ratios remain within the correct margins. Further, it is often desirable to monitor various parameters related to optical network signal traffic. Unfortunately, devices which allow for varying measurement of different channels passing through a point of an optical network tend to be either expensive, inflexible, or a combination of both.

BRIEF SUMMARY OF THE INVENTION

The present invention provides optical devices and methods. In aspects of the present invention a tunable optical element is provided. In one embodiment the tunable optical element comprises a moveable path changing optical element adapted to receive light in a first optical beam on a first path and provide the light in a second optical beam on a second path, the second path being dependent on the position of the moveable path changing optical element; and a position dependent optical element receiving the light in the second optical beam, the position dependent optical element changing a spectral characteristic of the light depending on the position of receipt of the light in the second optical beam by the position dependent optical element.

In another aspect of the present invention an optical device is provided. In one embodiment the optical device comprises a spatially varying optical unit, the spatially varying optical unit adapted to receive light provided on a plurality of paths, the spatially varying optical unit varying a spectral characteristic of received light depending on the path of the light; and means for providing light to the spatially varying optical unit on any one of the plurality of paths.

In another aspect of the present invention an optical device is provided. In one embodiment the optical device comprises means for reflecting light on a first path to any one of a plurality of second paths; and means for receiving light on at least two of the second paths and changing a spectral characteristic of the light depending on the path of the light.

In another aspect of the present invention a method of changing a spectral characteristic of light is provided. In one embodiment the a method of changing a spectral characteristic of light comprises receiving light on a first path; transferring the light on the first path to a selected path of any one of a plurality of second paths; and changing a spectral characteristic of the light depending on the selected path.

These and other aspects of the present invention will be more fully comprehended upon review of the following discussion in conjunction with the accompanying figures.

DETAILED DESCRIPTION

In embodiments of the present invention fixed, non-tunable optical element are fabricated in arrays. The optical elements each have a different characteristic. An optical beam is scanned across the array to select, or adjust, a desired property. In some embodiments there are three elements, a device in which a spectral property varies as a function of position, a micro-mechanically movable element that directs a beam to a position on the device, and optics to maintain good coupling through the system. In some embodiments a control loop is used to stabilize the system, for example to adjust for environmental changes and/or to lock optical properties.

Figure 1:
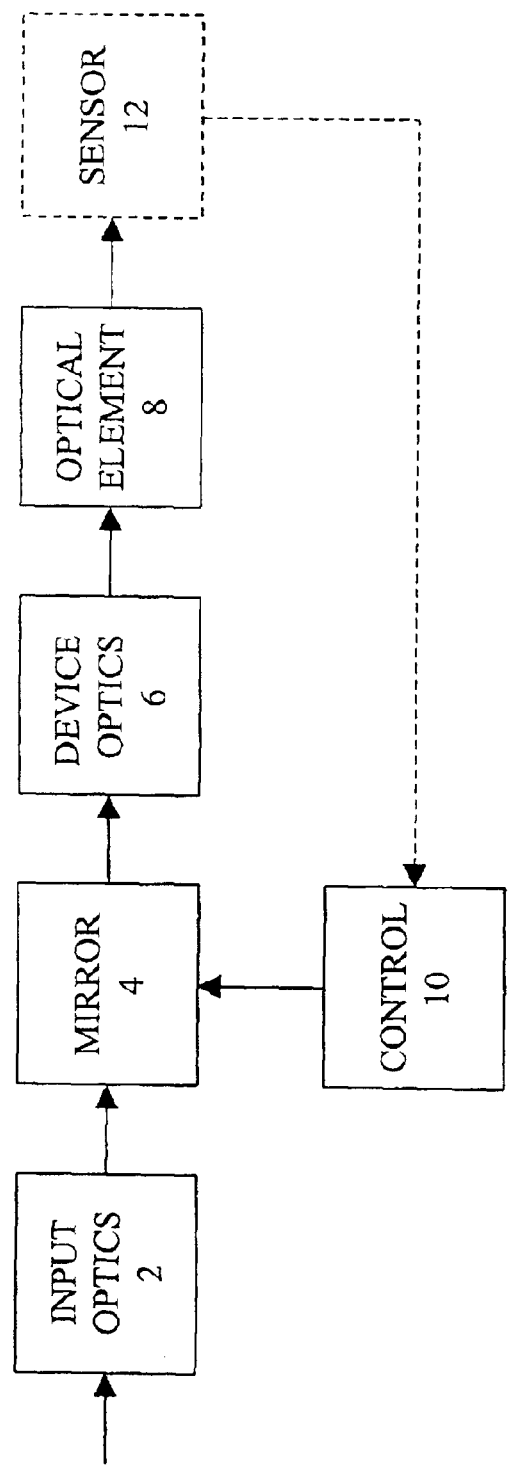
FIG. 1 is a block diagram of a tunable optical device in accordance with aspects of the present invention.

FIG. 1 is a block diagram of a tunable optical device in accordance with aspects of the invention. An input light beam is provided by a fiber. The light beam passes through input optics 2 to a mirror 4. In some embodiments the input optics form a collimating lens, with the fiber positioned one focal length from the collimating lens and the collimating lens forming a collimated beam passed to the mirror. In some embodiments the input optics form a lens with the fiber positioned one focal length from the lens on one side and the mirror positioned one focal length from the lens on the other side.

Light incident on the mirror is reflected through device optics 6 to a position dependent optical element 8. As with the input optics the device optics may be a collimating lens or a lens with the mirror and the position dependent optical element on either side of the device optics a focal length away. The position dependent optical element effects a change, other than merely directional changes, to a characteristic of the light based on the location at which the light is incident on the element. Some examples of such elements are discussed further below.

The mirror is a moveable mirror. In some embodiments the mirror is linearly translated. Linearly translatable mirrors may be actuated using a MicroElectroMechanical System (MEMS) actuator. Examples of such actuators include electrostatic comb drives combined with restoring springs, or thermally or electrically actuated devices. In some embodiments the mirror is a MEMS mirror rotatable about a single axis or about two axis. Manufacture of MEMS mirrors is relatively well known, and the mirrors may be fabricated using, for example, bulk micromachining with silicon wafers or silicon on insulator (SOI) wafers. The structure may formed by etching surfaces of the wafer with one or more masking steps. A metalization step may provide device contacts and also be used to form a highly reflective layer as the mirror surface. Backside etching and/or further etching steps on the front surface may also be useful to release strain or to create various device characteristics.

Returning to FIG. 1, movement of the mirror results in translation of the light beam incident on the position dependent optical element. Control of movement of the mirror is provided by a controller 10. In some embodiments the controller autonomously commands movement of the mirror according to a preprogrammed routine. Such a routine, for example, may cause the mirror to move with the result that the light beam periodically traverses the position dependent optical element in a known manner. In some embodiments the controller receives information from a monitoring element (not shown) associated with the optical fiber, or more commonly a monitoring device downstream of a path providing a signal to the optical fiber. In such embodiments the controller therefore receives information regarding light beams acted upon by the position dependent optical element and returned to an optical network.

In other embodiments the position dependent optical element passes some or all of the light beam to a monitoring device 12. The monitoring device measures a characteristic of the light beam and provides information regarding the characteristic to the controller. The controller uses the information regarding the characteristic to command movement of the mirror.

Figure 2:
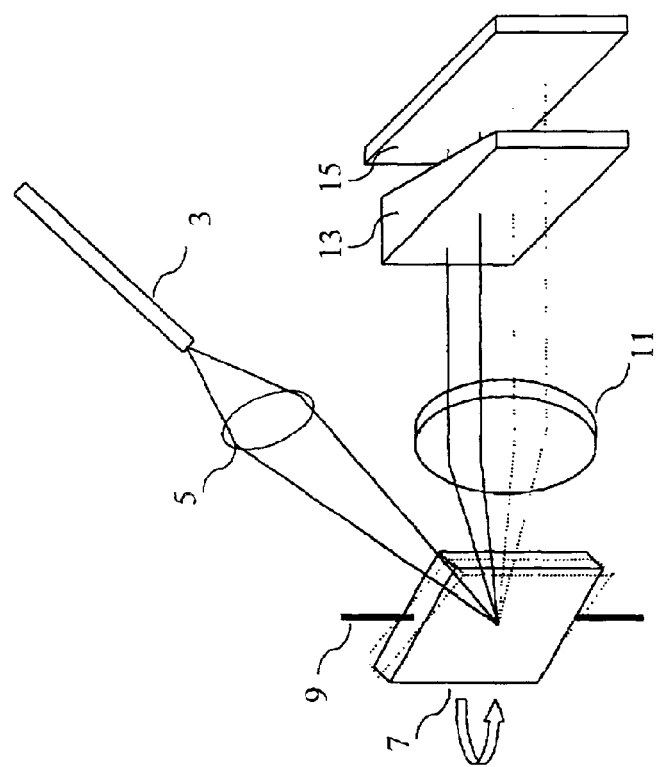
FIG. 2 illustrates a channel monitoring device in accordance with aspects of the present invention.

FIG. 2 illustrates an embodiment of the invention serving as a channel monitoring device. An optical fiber 3 provides a beam. The beam is passed through a first lens 5. The first lens collimates the beam and focuses the beam onto a mirror 7. The first lens can be a single element lens, as is shown in FIG. 2, or can be a lens assembly that first collimates the beam and then refocus the beam. This can be accomplished, for example, using multiple refractive surfaces or GRIN elements.

As illustrated in FIG. 2, the mirror is a MEMS mirror rotatable about an axis 9. The beam is incident on the mirror and reflected to a second lens 11. As the beam is focused on the mirror by the first lens the beam diverges as it moves from the mirror. The divergent beam is passed through a second lens 11. The second lens is a collimating lens, the mirror and second lens are one focal length apart, and the beam is therefore collimated by the second lens.

The collimated beam is provided to a Fabry-Perot filter 13. The filter is an etalon, with the etalon forming a reflective Fabry-Perot cavity. The distance between front and rear surfaces of the etalon define the cavity length, and the cavity length determines the resonant wavelength of the filter. The filter substantially reflects light at wavelengths other than the resonant wavelength, which is transmitted through the filter.

The etalon is a wedge shaped etalon, although in alternative embodiments the etalon is formed of a series of discrete steps. Accordingly, the cavity length, and therefore the resonant wavelength, varies along the etalon. Therefore the etalon acts on the collimated beam with differing results dependent on the portion of the etalon through which the beam passes. As the wedge shaped etalon provides a tapered cavity, the wavelength of light transmitted through the etalon depends on the physical position where the beam interacts with the cavity.

A portion of the beam passes through the etalon to a detector 15. The detector is a photodetector sufficiently large to detect light emanating from a large number of points on the etalon, although in some embodiments further lenses are used to focus light emanating from the etalon on the photodetector.

Two alternative positions are shown for the mirror in FIG. 2, with a second position illustrated through the use of dashed lines. The angle of the beam reflected from the mirror depends on the angle of the mirror, and two beams are shown, where the solid lines and dashed lines to correspond to the solid and dashed positions of the mirror. In either mirror position, and a great number of other mirror positions, the reflected beam is collimated by the second lens. The second lens therefore forms parallel rays that are displaced laterally depending on the angle of the mirror.

Figure 3B:
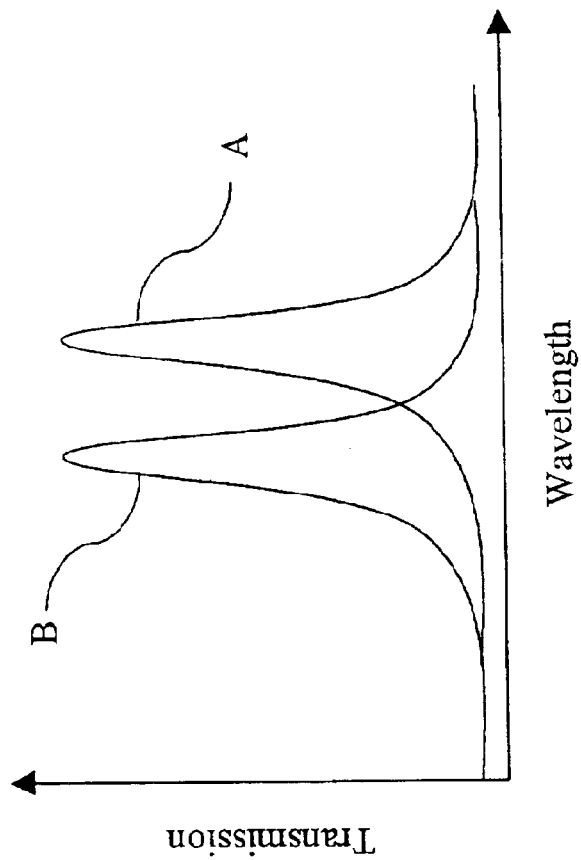
FIG. 3B is a graph showing percent transmission through the etalon of FIG. 3A.
Figure 3A:
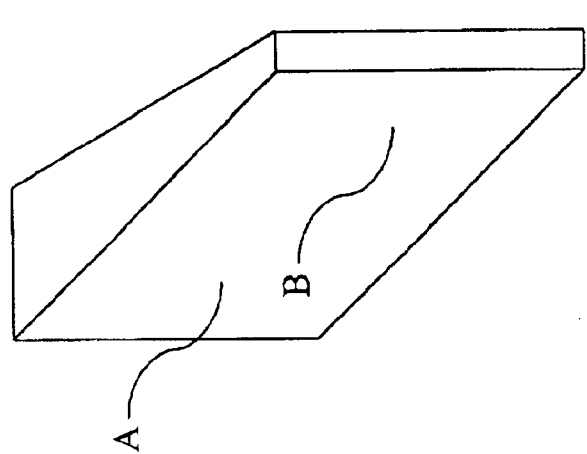
FIG. 3A illustrates an embodiment of an etalon in accordance with aspects of the present invention.

FIG. 3A illustrates an embodiment of an etalon used in the system of FIG. 2. The etalon of FIG. 3A is made in the shape of a wedge. The outer surfaces are reflective, and the thickness of the spacer layer between the reflective surfaces varies in the lateral direction. Since the thickness of the cavity formed by the reflective surfaces is tapered, transmission of a beam incident on the etalon is varied depending on the location of incidence.

In FIG. 3A two points on the front surface of the etalon are marked as position A and position B. Position A is at a point where the thickness of the etalon is greater, and the cavity length larger, than at the point indicated by position B. FIG. 3B is a graph of percent transmission of beams incident at position A and position B through the etalon of FIG. 3A with respect to wavelength. Since the etalon is tapered, the maximum percent transmission through the etalon of light of various wavelengths changes depending on the point of incidence. Thus, as shown in the graph of FIG. 3B, maximum percent transmission of light at point B is for light at a lower wavelengths, and maximum percent transmission of light at point A is for light at higher wavelengths.

Returning to FIG. 2, in operation, for example for channel monitoring applications, the incoming beam is scanned across the etalon by rotating the mirror. At positions on the etalon where the wavelength of the beam corresponds to the resonant wavelength of the etalon, there is significant power received at the photodetector. Since the transfer function of the system is known, the spectral content of the optical signal can be measured directly. Moreover, this may be accomplished in a compact configuration.

Figure 4:
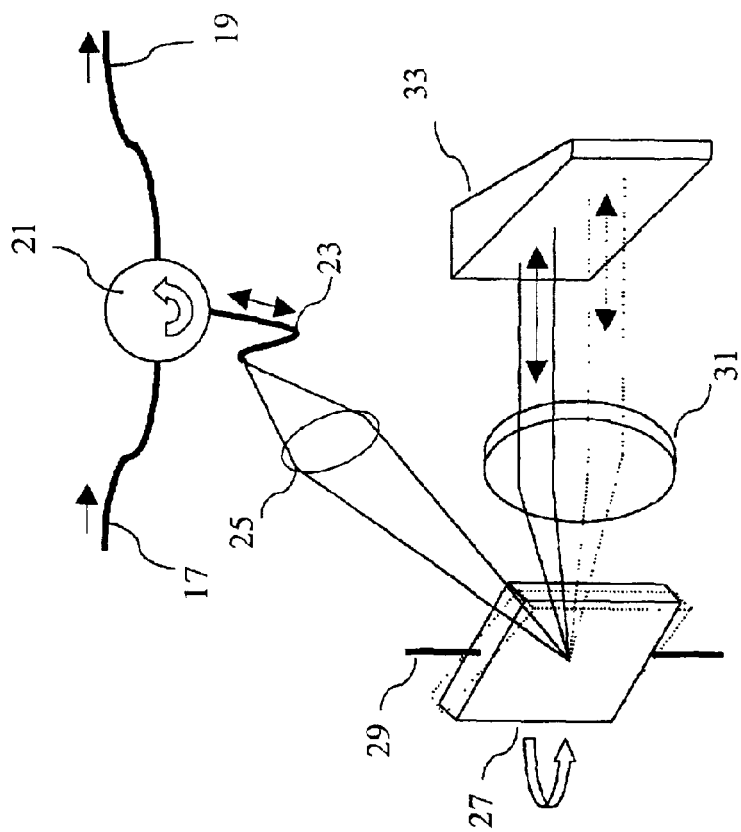
FIG. 4 illustrates an embodiment of the invention serving as a dispersion compensator.

FIG. 4 illustrates an embodiment of the invention serving as a dispersion compensator. An optical fiber 17 provides light to an optical circulator 21. The optical circulator directs light into a fiber 23. The fiber 23 provides a beam. The beam is passed through a lens 25. The lens, which in various embodiments may be a single lens or a lens assembly, focuses the beam on a mirror 27. The mirror is a rotatable MEMS mirror, such as previously discussed. The reflected beam is passed through a collimating lens 31 to an optical element 33. The optical element reflects a return beam back through the collimating lens, off the mirror, through the lens, and back into the fiber. The fiber provides the light of the return beam to the optical circulator, which passes the light of the return beam to an output optical fiber 19.

Figure 5B:
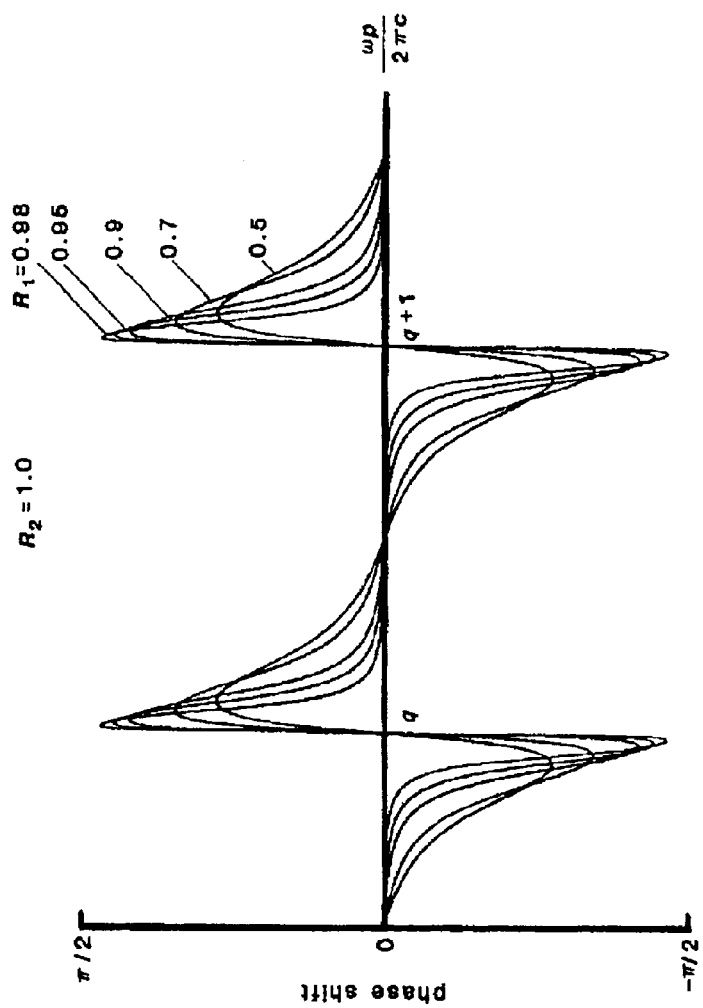
FIG. 5B is a graph showing the relationship between phase shift and frequency for an interferometer.
Figure 5A:
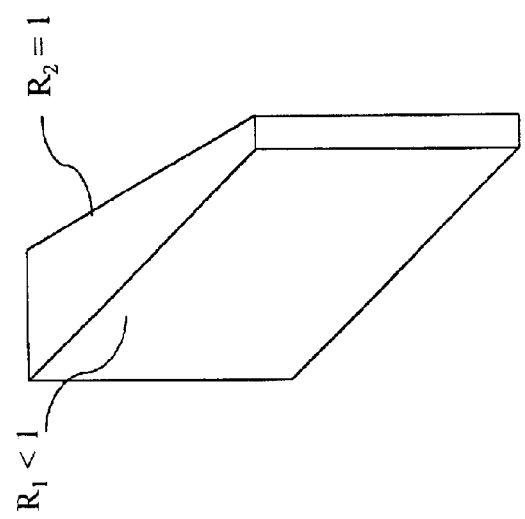
FIG. 5A illustrates an embodiment of an optical element useful with the embodiment of FIG. 4.

FIG. 5A illustrates an embodiment of the optical element of FIG. 4. In FIG. 5A the optical element is a G-T interferometer. The G-T interferometer forms a Fabry-Perot cavity defined by a front reflective surface and a back reflective surface. The front surface is slightly reflective, with a reflectivity $R_1$ less than 1, and the back reflective surface is highly reflective, with a reflectivity $R_2$ close to unity. The total reflectivity of the interferometer is therefore close to unity. The thickness of the cavity separating the front and back surfaces determines the free spectral range of the element.

Although a beam may be reflected by the interferometer without substantial loss, the phase of the reflected beam may be modified by the interferometer. Generally, the phase of the reflected beam with respect to an input beam is dependent on the resonant wavelength of the interferometer, which in turn is dependent on the cavity length, the wavelength of incident light, and the reflectivity of the front surface of the interferometer. FIG. 5B is a graph showing the relationship between phase shift and frequency for a G-T interferometer for a variety of values of reflectance for a front surface. As illustrated, approximate resonant frequencies the phase shift changes relatively dramatically with respect to changes in frequency. Accordingly, dispersion provided by the interferometer may be substantial, and, as illustrated in FIG. 5B, may either increase with frequency or decrease with frequency.

Returning to the optical element of FIG. 5A, the interferometer is wedge shaped, with a tapering distance between the front and back surfaces, although in various embodiments discrete steps are used. The resonant frequency of the interferometer therefore varies along its length. For an input beam of non-varying wavelength and a non-changing reflectivity of the front surface of the interferometer, therefore, changing the location of incidence of a beam on the interferometer changes the dispersive effect provided by the interferometer. The system of FIG. 4, therefore, provides a tunable dispersive element.

Operation of the system of FIG. 4 may be seen through the use of dotted lines for the mirror in a second position and corresponding dotted lines indicating a reflected beam incident on the optical device at a second location. Due to the varying width of the optical device the resonant frequency of the device is different in the second location than the location of incidence when the mirror is positioned as indicated as solid lines. With reference to FIG. 5B it will be understood that the amount of dispersion provided by the optical element varies with the position of incidence of the beam.

Moreover, the thickness of the interferometer may be substantially such that the free spectral range corresponds roughly to channel spacing in a WDM telecommunications system, for example 100 GHz. Use of such an interferometer allows for simultaneous adjustment of dispersion of all channels, or for the use of the multiple separate devices, each with the same components, for varying demultiplexed channels.

The implementation discussed above results in a collimated beam directed at a spatially varying optical element. This is advantageous for devices such as Fabry-Perot etalons that preferably use collimated beams, but reduces the total tuning range for a given size of the device, as collimated beams may be relatively large and one would require considerable spatial separation between beams.

Figure 6:
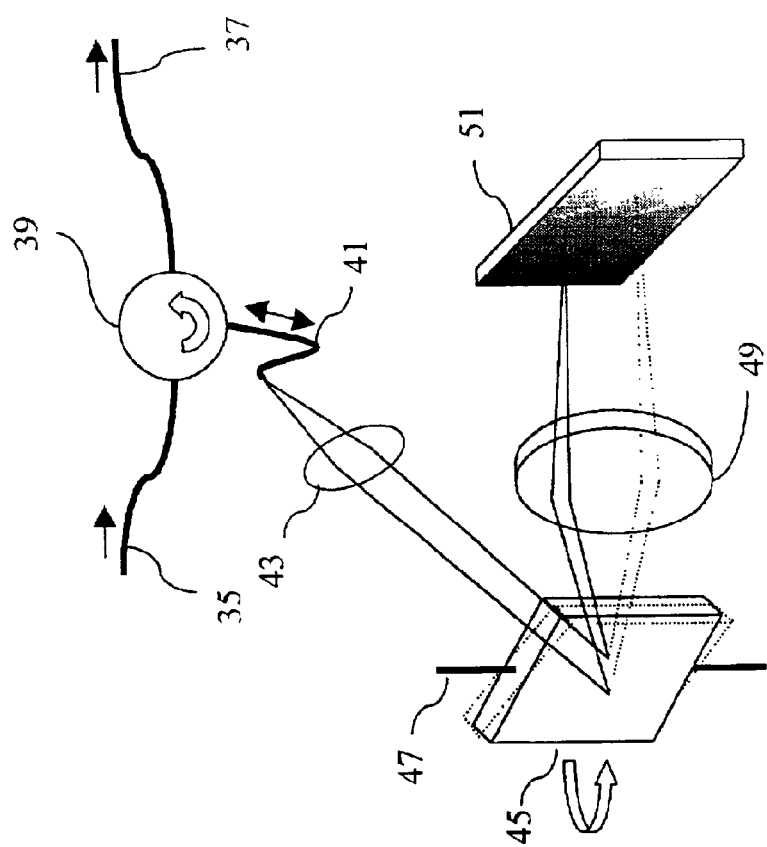
FIG. 6 illustrates further aspects of the invention in a more compact geometry.

An alternative implementation that results in a more compact geometry is shown in FIG. 6. Such a configuration could be used for a number of applications. One such application provides polarization compensation. As illustrated in FIG. 6 an input optical fiber 35 provides light to an optical circulator 39. The optical circulator provides the light to an optical fiber 41. The optical fiber provides a beam to a lens 43, or assembly of lenses, which forms a collimated beam. The collimated beam is incident on a mirror 45, such as a MEMS mirror. The mirror is rotatable about an axis 47. The mirror reflects the beam through a second lens 49 which focuses the beam onto a spatially varying optical element 51.

In one embodiment the optical element has different reflectivities for different polarizations, and the reflectivity varies spatially across the device. For example, in one embodiment, at one side of the device the reflectivity for s-polarization is unity and zero for p-polarization. The reflectivity changes across the device such that the reflectivity becomes unity for p-polarization and zero for s-polarization at the opposing side of the device. Such an optical element can be made by appropriately coating a polarizer, or by assembling a number of optical elements to provide the same function. In such an embodiment, light from the reflected beam retraces the path back into the optical fiber and passes to an output fiber 37 by way of the optical circulator.

In a further embodiment the mirror is rotatable about two axis. The optical element also varies in both the horizontal and vertical directions. Such an embodiment is useful, for example, for polarization control, where one direction across the optical element controls linear polarization while a second direction controls circular polarization, such that the entire poincare sphere is covered.

Figure 7:
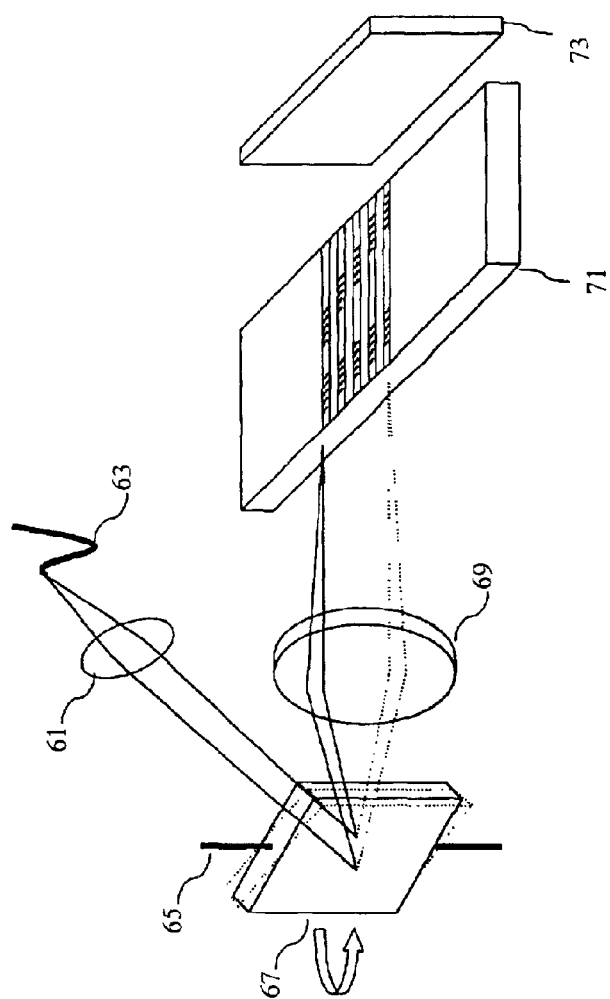
FIG. 7 illustrates a further embodiment in accordance with aspects of the present invention making use of a wave guide.

A further embodiment is illustrated in FIG. 7. In FIG. 7 an optical fiber 63 provides a light beam. The light beam passes though a collimating lens 61 forming a collimated beam. The collimated beam is reflected by a rotatable mirror 67, with the mirror rotatable about an axis 65. The reflected collimated beam passes through a lens 69, which focuses the beam on an optical element 71 with varying properties depending on the location of incidence of the focused beam.

As illustrated in FIG. 7 the optical element is planar waveguide device with a number waveguides arranged in an array. The planar waveguide device may be made in SOI material, $SIO_2/Ge:SiO_2$, or semiconductor materials, such as are discussed, for example, in M. Levy et al., Fabrication of Narrow-band Channel Dropping Filters, 4(12) Photonics Technology Letters 1378–1381, the disclosure of which in incorporated herein in its entirety.

In various embodiments the waveguides act as Fabry-Perot resonators, with mirrors made of gratings, or Mach-Zehnder interferometers, with splitters and recombiners. In one embodiment, the planar waveguides each have broad-band gratings etched into them, with the spacing between gratings varying for different waveguides. For example, in one embodiment a first waveguide has gratings such that the first waveguide transmits light at ITU wavelength 35. A second waveguide has gratings such that the second waveguide transmits light at ITU wavelength 37. Thus, a detector 73 positioned behind the waveguide may monitor light for particular wavelengths depending on position of the mirror. As illustrated, the detector is a single large detector. In various embodiments, however, a plurality of small detectors are used, for example one detector per waveguide.

In a further embodiment the temperature of the optical element is adjustable. Such may be accomplished, for example, using a thermoelectric cooler (TEC), resistive heaters, or other elements. For an embodiment discussed above, therefore, transmission of light at ITU wavelength 36 may be accomplished by cooling the waveguide and transmitting light through the second waveguide.

In yet a further embodiment the waveguides are used in reflection, with an optical circulator returning light to an output fiber. In such an embodiment waveguide characteristics of the array of waveguides provide differing dispersion, or other differing characteristics.

Further, the waveguides themselves may be used as narrow band optical receivers. Such may be accomplished, for example, through fabrication of the waveguides in a semiconductor material, such as InGaAs or InP. One such embodiment includes a structure similar to a vertical cavity laser array, with the elements of the array reverse biased.

Thus, the present invention provides a tunable optical device. Although the present invention has been discussed with respect to certain embodiments, it should be recognized that the invention is defined by the claims supported by this disclosure and their equivalents.

What is claimed is:

1. A tunable optical element comprising:
   a moveable path changing optical element adapted to receive light in a first optical beam on a first path and provide the light in a second optical beam on a second path, the second path being dependent on the position of the moveable path changing optical element; and
   a position dependent optical element receiving the light in the second optical beam, the position dependent optical element changing a spectral characteristic of the light depending on the position of receipt of the light in the second optical beam by the position dependent optical element.

2. The tunable optical element of claim 1 wherein the moveable path changing optical element is a mirror.

3. The tunable optical element of claim 2 wherein the mirror is rotatable about an axis.

4. The tunable optical element of claim 3 wherein the mirror is a MEMS mirror.

5. The tunable optical element of claim 4 wherein the position dependent optical element is a Fabry-Perot filter formed of reflective front and rear surfaces, with the distance between the front and rear surfaces varying with location.

6. The tunable optical element of claim 5 wherein the Fabry-Perot filter is wedge shaped.

7. The tunable optical element of claim 5 wherein the Fabry-Perot filter is a wedge shaped etalon.

8. The tunable optical element of claim 5 wherein the Fabry-Perot filter is formed of a number of discrete steps of varying cavity length.

9. The tunable optical element of claim 5 further comprising a detector receiving light spectrally changed by the position dependent optical element.

10. The tunable optical element of claim 9 further comprising optics collimating the light in the second optical beam.

11. The tunable optical element of claim 10 further comprising a controller commanding adjustments in the position of the mirror.

12. The tunable optical element of claim 1 wherein the position dependent optical element is an interferometer having different resonant wavelengths along the length of the interferometer.

13. A tunable optical element comprising:
   a moveable path changing optical element adapted to receive light in a first optical beam on a first path and provide the light in a second optical beam on a second path, the second path being dependent on the position of the moveable path changing optical element;
   a position dependent optical element receiving the light in the second optical beam, the position dependent optical element changing a spectral characteristic of the light depending on the position of receipt of the light in the second optical beam by the position dependent optical element;
   wherein the position dependent optical element is an interferometer having different resonant wavelengths along the length of the interferometer; and
   a fiber providing light in the first optical beam and receiving light with a spectral characteristic changed by the interferometer.

14. The tunable optical element of claim 13 further comprising an optical circulator providing light to the fiber and receiving light from the fiber.

15. The tunable optical element of claim 1 wherein the position dependent optical element has different reflectivities for different polarizations, the reflectivity varying spatially across the position dependent optical element.

16. The tunable optical element of claim 15 further comprising a fiber providing light in the first optical beam and receiving light with a spectral characteristic changed by the interferometer.

17. The tunable optical element of claim 16 further comprising an optical circulator providing light to the fiber and receiving light from the fiber.

18. The tunable optical element of claim 1 wherein the position dependent optical element is an array of waveguides, with different waveguides having different spectral characteristics.

19. An optical device comprising:
   a spatially varying optical unit, the spatially varying optical unit adapted to receive light provided on a plurality of paths, the spatially varying optical unit varying a spectral characteristic of received light depending on the path of the light; and
   means for providing light to the spatially varying optical unit on any one of the plurality of paths.

20. The optical device of claim 19 wherein the spatially varying optical unit changes the phase of the light varying amounts based on the wavelengths present in the light.

21. The optical device of claim 20 wherein the spatially varying optical unit is an interferometer with a spatially varying cavity length.

22. The optical device of claim 20 wherein the spatially varying optical unit changes the dispersion of the light.

23. The optical device of claim 19 wherein the spatially varying optical unit filters the light based on wavelength.

24. The optical device of claim 23 wherein the spatially varying optical unit is a Fabry-Perot filter with a spatially varying cavity length.

25. The optical device of claim 23 wherein the spatially varying optical unit is a reflector, the reflectivity of the reflector spatially varying.

26. The optical device of claim 25 wherein the reflector has varying reflectivities for varying polarities spatially across the reflector.

27. The optical device of claim 19 wherein the spatially varying optical unit is an array of waveguides each having different characteristics.

28. The optical device of claim 27 wherein each of the waveguides has gratings, the gratings having different spacings for different waveguides.

29. An optical device comprising:
   means for reflecting light on a first path to any one of a plurality of second paths; and
   means for receiving light on at least two of the second paths and changing a spectral characteristic of the light depending on the path of the light and position of the light incident on the means for changing a spectral characteristic.

30. A method of changing a spectral characteristic of light comprising:
   receiving light on a first path;
   transferring the light on the first path to a selected path of any one of a plurality of second paths;
   receiving the transferred light; and
   changing a spectral characteristic of the light depending on the selected path and location of the received transferred light.

31. The device of claim 29 further comprising means for providing the light on the first path and receiving back the light with the changed spectral characteristic.

32. The method of claim 30 further comprising receiving back the light with the changed spectral characteristic.

33. An optical device comprising:
   an optical circulator;
   a movable mirror;
   a first fiber providing light to the optical circulator;
   a position dependent optical element;
   a second fiber receiving light directed from the optical circulator and providing the light to the movable mirror, the movable mirror reflecting the light from the second fiber to the position dependent optical element changing the spectral characteristic of the light from the movable mirror based on a path of the light from the movable mirror and position of the light incident on the position dependent optical element; and
   wherein the position dependent optical element reflects back the light with the changed spectral characteristic to the movable mirror that reflects the light with the changed spectral characteristic back into the second fiber with the movable mirror remaining stationary after reflecting light to the position dependent optical element.

34. The device of claim 33 wherein the light reflected back into the second fiber has an amount of dispersion opposite to dispersion accumulated during transmission.

35. An optical device comprising:
   an optical circulator;
   a movable mirror;
   a spatially varying optical element;
   a first fiber providing light to the optical circulator;
   a second fiber receiving light directed from the optical circulator and providing the light to the movable mirror, the movable mirror reflecting the light from the second fiber to the spatially varying optical element changing the spectral characteristic of the light from the movable mirror based on a path of the light from the movable mirror and position of the light incident on the spatially varying optical element;
   wherein the spatially varying optical element reflects back the light with the changed spectral characteristic to the movable mirror that reflects the light with the changed spectral characteristic back into the second fiber; and
   wherein the spatially varying optical element has different reflectivities varying spatially across the optical element for different polarizations of light.

36. The device of claim 35 wherein the light reflected back into the second fiber has an amount of dispersion opposite to dispersion accumulated during transmission.

37. The device of claim 35 wherein the spatially varying optical element has one side having a reflectivity for s-polarization being unity and zero for p-polarization light and has a reflectivity that changes across the optical element in that the reflectivity is unity for p-polarization and zero for s-polarization light at an opposing side of the optical element.

38. The device of claim 37 wherein the mirror is rotatable about two axes and the optical element is movable in two directions, one direction controls linear polarization and another direction controls circular polarization.

39. An optical device comprising:
   a movable mirror;
   a planar waveguide having a plurality of waveguides arranged in an array;
   an optical fiber providing light to the movable mirror that reflects the light to at least one of the plurality of waveguides;
   wherein the at least one of the plurality of waveguides changes the spectral characteristic of the light from the movable mirror based on a path of the light from the movable mirror and position of the light incident on the at least one of plurality of waveguides; and
   wherein each of the plurality of waveguides has an etched broadband gratings with spacing between the gratings varying for each of the plurality of waveguides in that each of the plurality of waveguides transmits light at a wavelength different from that of other plurality of waveguides.

40. The device of claim 39 further comprising a detector positioned behind the planar waveguide to monitor light for a particular wavelength depending on position of the mirror and wherein the movable mirror selectively directs light from the optical fiber to one of the plurality of waveguides to provide light to the detector having a particular wavelength.

41. The device of claim 39 further comprising:
   an optical circulator;
   a first fiber providing light to the optical circulator;
   a second fiber receiving light directed from the optical circulator and providing the light to the movable mirror;

wherein the at least one of the plurality of waveguides reflects back the light with the changed spectral characteristic to the movable mirror that reflects the light with the changed spectral characteristic back into the second fiber.

42. The device of claim 41 wherein the light reflected back into the second fiber has an amount of dispersion opposite to dispersion accumulated during transmission.

* * * * *